United States Patent [19]
Gignoux et al.

[11] Patent Number: 5,400,380
[45] Date of Patent: Mar. 21, 1995

[54] DYNAMIC ALLOY CORRECTION GAUGE

[75] Inventors: Dominque Gignoux, Bethesda; Roland M. Gouel, Gaithersburg, both of Md.

[73] Assignee: Data Measurement Corporation, Gaithersburg, Md.

[21] Appl. No.: 50,262
[22] PCT Filed: Mar. 12, 1992
[86] PCT No.: PCT/GB92/00448
§ 371 Date: Mar. 5, 1993
§ 102(e) Date: Mar. 5, 1993
[87] PCT Pub. No.: WO92/16819
PCT Pub. Date: Oct. 1, 1992

[30] Foreign Application Priority Data

Mar. 18, 1991 [GB] United Kingdom ............ 9105639

[51] Int. Cl.$^6$ ........................... G01B 15/02
[52] U.S. Cl. ........................... 378/54; 378/90
[58] Field of Search .............. 378/90, 89, 54–56

[56] References Cited

U.S. PATENT DOCUMENTS

| | | |
|---|---|---|
| 3,188,471 | 1/1961 | Hansen et al. |
| 3,210,545 | 10/1965 | Barnett. |
| 3,499,152 | 3/1970 | Hetenhouser. |
| 3,569,708 | 7/1967 | Weinbaum. |
| 4,047,029 | 9/1977 | Allport. |
| 4,064,396 | 12/1977 | Panarello. |
| 4,119,846 | 10/1978 | Outhwaite. |
| 4,803,715 | 2/1989 | Cho ........................ 378/90 |

FOREIGN PATENT DOCUMENTS

| | | |
|---|---|---|
| 0075190 | 3/1983 | European Pat. Off. |
| 925197 | 3/1955 | Germany. |
| 763667 | 12/1956 | Germany. |

OTHER PUBLICATIONS

A New Measurement and Control System for Rubber Calendaring, Apr. 1988, Akron, Ohio, US, pp. 28–34; H. T. Jaggers.

Backscatter/Transmission X-ray Thickness Gauge, J. J. Allport, N. L. Brouwer and R. A. Kramer, pp. 217–225, NDT Inter vol. 20 No. 4, Aug. 1987.

*Primary Examiner*—Craig E. Church
*Attorney, Agent, or Firm*—Lowe, Price, LeBlanc & Becker

[57] ABSTRACT

A method of calculating the thickness of a sheet material comprising directing a beam of photons against the sheet material from a photon source (1) located on one side of said sheet material (7), detecting reflected radiation from said sheet material in a first detector (2) located on the same side of said sheet material and detecting transmitted radiation in a second detector (5) located on the opposite side of the said sheet material, combining the signals of transmitted and reflected photon beams, measuring and processing the data from both detectors for a number of calibrating samples, obtaining the thickness as a function of the detected data and applying this function to determine the unknown thickness of a sample. Apparatus for carrying out the method of the invention is also disclosed.

10 Claims, 4 Drawing Sheets

DYNAMIC ALLOY CORRECTION GAUGE

For several decades measurement of sheets of metal in production plants where the sheets are continuously moving, such as steel mills, beverage can or automobile factories, has been accomplished by measuring the absorption of a beam of radiation. This method of measurement is described in particular in the paper "Steel Measurement by Radiation Gauges" by D. Gignoux, published in "Steel Technology International" (1990) on pages 257 to 260.

When the radiation beam consists of electrons, i.e. beta radiation, the measurement of the absorption by the material can be translated readily into a measure of mass per unit area of the material. For some applications the mass per unit area is the quantity that is used to represent thickness. In other cases, it suffices to divide the mass per unit area by the density to obtain the physical thickness expressed in units of length. Beta radiation cannot be obtained in very intense beams as a practical matter, so that the measurements are too slow to be suitable for modern mill control computers. Another problem is that beta radiation is suitable to measure relatively thin material only.

X-ray beams are used the most often. They can be obtained with enough intensity and their energy can be varied so that it is possible to measure aluminium, steel, other metals and some plastics materials. However, the figure obtained for the absorption by a sheet of a certain metal is very much dependent on the composition of the metal.

For instance, when gauging aluminium, if the sheet contains a small percentage of some metal higher than aluminium in the periodic table of elements such as zinc, iron or copper, measurement may be inaccurate if the composition is not taken into account. If the composition is known, it is quite possible to relate the thickness to the absorption measurement. In most cases, the relation consists essentially of using the basic function relating absorption to thickness of pure metal and multiplying the result by an alloy factor. The requirement of modern mills for an accuracy of measurement of 0.1% requires, for certain aluminium alloys, that the composition be known very accurately, this is not really possible. Furthermore, sometimes the variation in composition between one end of the coil and the other is sufficiently large to create errors. Several schemes have been proposed for solving this problem. One consists of coupling the X-ray gauge to a gauge using a beam of beta particles generally produced by a radioisotope. This has several disadvantages in practice as it requires 2 different gauges measuring at 2 different points. Another scheme is the possibility of using 2 X-ray gauges producing beams of two different energies so that they do not have the same absorption characteristic. This method is good only when the concentration of only one alloying element varies. For instance, zinc in aluminium is uncertain, also the two measurements need to be made with an extreme degree of accuracy for the ultimate result to be itself of sufficient accuracy.

According to the invention, there is provided a method of calculating the thickness of a sheet material comprising directing a beam of photons against the sheet material from a photon source located on one side of said sheet material, detecting reflected or "backscattered" radiation from said sheet material in a first detector located on the same side of said sheet material and detecting transmitted radiation in a second detector located on the opposite side of the said sheet material, combining the signals of transmitted and reflected or "backscattered" photon beams, measuring and processing the data from both detectors for a number of calibrating samples, obtaining the thickness as a function of the detected data and applying this function to determine the unknown thickness of a sample.

The invention also provides an apparatus for calculating the thickness of a sheet material comprising a source of photons located on one side of said sheet material, adapted to direct a beam of photons from said photon source against said sheet material, a first detector located on the same side of said sheet material for detecting reflected or "backscattered" radiation from said sheet material and a second detector located on the opposite side of the said sheet for detecting transmitted radiation, computing means for combining the signals of transmitted and reflected or "backscattered" photon beams and computing and signal processing means for measuring and processing the data from both detectors for a number of calibrating samples, whereby the thickness of the sheet material is obtained as a function of the detected data and the function is applied to determine the unknown thickness of a sample.

In a preferred embodiment of an apparatus for carrying out the invention, the first detector is disposed so that it surrounds the photon beam source.

In another embodiment of the invention, the source of photons is an X-ray generator.

In carrying out the method of the invention, a computer means carrying out the measurement and processing of the signals uses a polynomial in two variables employing a best-fit method and in yet another aspect of the invention, the best-fit method is a least square approximation.

In a further embodiment of the method according to the invention, the computing means are employed to fit a linear function through three points surrounding an unknown point, said linear function being then used to calculate the unknown thickness, while in an alternative embodiment of the invention, the computer functions with a quadratic function and six data points. The invention further provides a method of calibration which includes the step of using a sample placed in the beam of photons, memorising the data representing beam intensity received by the detector and multiplying the data obtained in a measurement by the ratio of variation of the data obtained by the sample. Alternatively, the calibration includes the step of multiplying the intensities of the beam of radiation and the reflected or "backscattered" beam by the ratio of these values obtained at the time of measurement to the same values obtained at the time of calibration.

The present invention relates to a method, to be described herein, which consists of utilizing the information from a transmission beam of X-ray radiation and also that of a reflected or "backscattered" beam. Whenever a beam of photons encounters matter, three phenomena of interest for gauging purposes occur: First, the beam goes through the material yielding on the other side a transmitted beam. Second, fluorescence occurs at frequencies or energy levels that are characteristics of the elements in question and third, a portion of the beam is scattered. For our purpose it will suffice to consider the reflected beam, hereinafter also referred to as the backscattered beam, as a diffuse reflection of the initial beam by the material, bearing in mind that this reflection is not a surface phenomenon but occurs throughout the material. For all the materials considered here, fluorescence occurs at low energy levels of less than 10 kv. It is therefore easy to differentiate between fluorescence and backscattered beams as the latter has an energy mostly higher than that of the fluorescence radiation.

The method is suitable for any alloy or mixtures where small composition variation cause variations in absorption. Aluminium and stainless steel are of particular interest.

Prior art regarding this matter has been found in U.S. Pat. Nos. 3,210,545 dated Oct. 5, 1965 Barnett, 4,047,029 dated Sep. 6, 1977, Allport and 4,803,715 Cho, dated Feb. 7, 1989.

However, the matter presented by these inventors applies only to the case where the alloy correction factor is known and only the variation between the true alloy correction factor and the assumed but inaccurate alloy correction factor is determined by the measurement method.

The present invention seeks to provide a method of measurement in which a sheet of any alloy, for instance an alloy of aluminium, can be measured without the need to know the approximate composition of the material. The invention also seeks to provide a measuring device that is fast enough to be used for modern mill control computers. The invention further seeks to provide a measurement which has little of the small fluctuations of the measurement with time, commonly referred to as "noise" by signal processing engineers.

Figure 1:
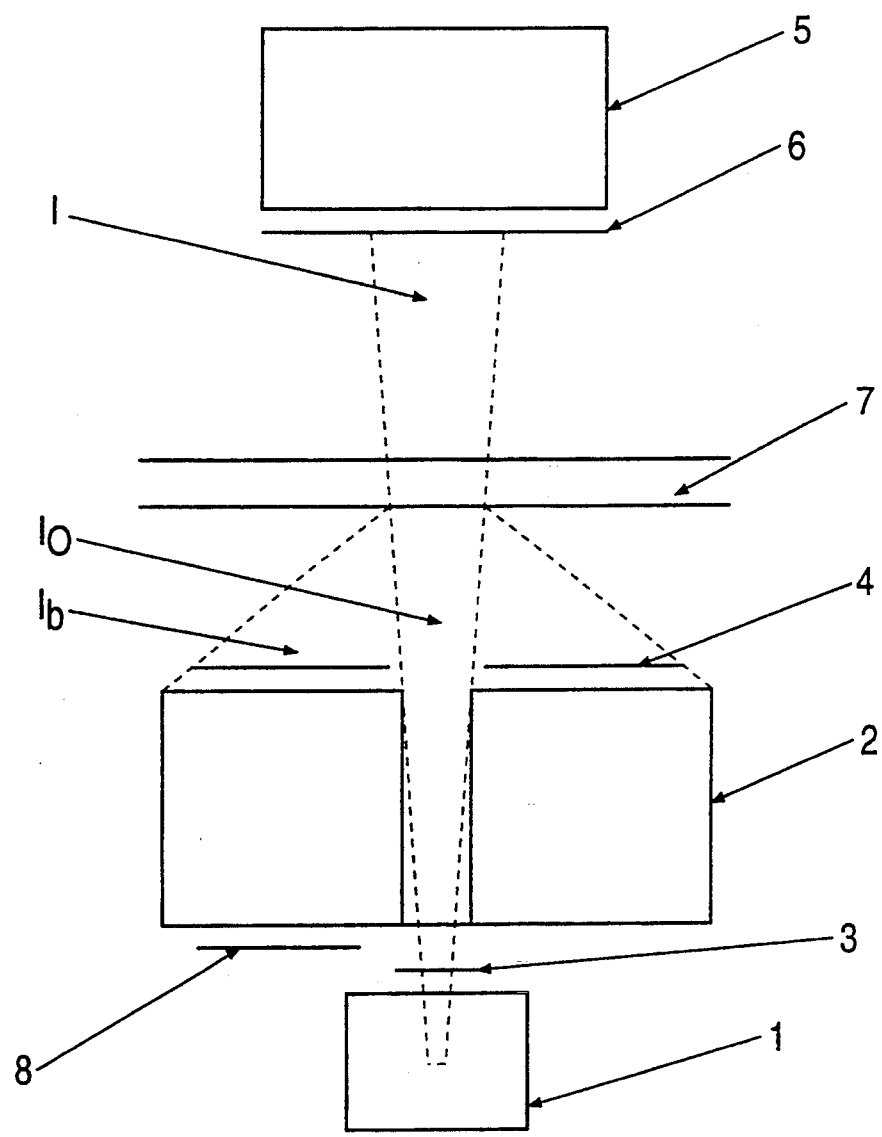
FIG. 1 shows a preferred embodiment of the invention.

According to one embodiment of the invention, a measuring device will therefore consist of a source of radiation, which could be a radioisotope but is preferably an X-ray source and a detector of backscattered radiation located on one side of the sheet of metal to be measured. On the other side is a detector of radiation to measure the transmitted beam. Computers are used to process the signal from both detectors and used to provide the thickness measurement. A particular embodiment of the invention is shown in FIG. 1 of the accompanying drawings, in which an X-ray source 1 produces a beam of radiation of an intensity $I_o$. This beam, when going through the material to be measured 7, results in a beam of radiation of intensity I which is captured by a detector 5, and in a backscatter beam $I_b$ which is detected by a detector of radiation for the backscatter beam 2. In this particular embodiment the detector is shown as surrounding the X-ray beam. This configuration has the advantage that a larger portion of the beam is being detected than if the detector and the source of radiation were side by side. Depending on the type of material being measured, filters to eliminate part of the radiation beam, may be located in the appropriate beam, such as the filter 3 in the incident X-ray beam, the filter 4 in the backscattered beam and the filter 6 in the transmitted beam, on the backscatter detector 4, or on the transmitted beam detector 5. The detectors 2 and 5 are ion chambers detectors of a type described in "Radiation Detection and Measurement" by Glenn F. Knoll, published by John Wiley & Sons (Canada) in 1979. A shutter 8 consists of a metal plate capable of absorbing the beam of radiation. Differentially filtered ion chambers are preferred as they have the ability to limit detection to a certain band of energy. These are described in Rhode's U.S. Pat. No. 3,514,602, dated May 26, 1970.

It is important that the intensity and the energy of the x-ray source be maintained at a constant level. This is obtained by a regulating circuit, which may be of one of several types in existence today.

The signal processing computer accepts the signals from the ion chambers 2 and 5 generally in the form of voltages proportional to the intensity of radiation received by these chambers. The computer then receives the two values representing the two measured quantities I and $I_b$. In the most general case, the thickness X is a function of the two quantities I and $I_b$ as follows:

$$X = F(I, I_b)$$

Although analytical expressions may be found for this function, it is not possible to use them for an actual measurement. The method for obtaining this function, which is used for a calibration operation is as follows: A measurement is made of a large number of samples representing various known thicknesses within the range in which the measurement is to be made and various compositions. In representing this data in a 3-dimensional space in X, I and $I_b$, one finds that the points generally fall on a smooth surface. When a sheet of unknown thickness X is placed into the beam the values of $I_b$ and I are measured. The point on the surface corresponding to these values is found and a value of X determined. One needs, therefore to find a function that best represents the surface in question. There are several methods that can be used to accomplish this. One consists of using a polynomial of the form:

$$X = \Sigma a_{ij} I^i I_b^j$$

This polynomial can then be fitted to the experimental data using several methods, for instance, "Curve and Surface Fitting, an Introduction" by P. Lankaster and K. Salkauskas, published by Academic Press in 1986.

Of course, the greater the number of coefficients in the polynomial, the greater the accuracy. This then requires a large number of data points.

Figure 2:
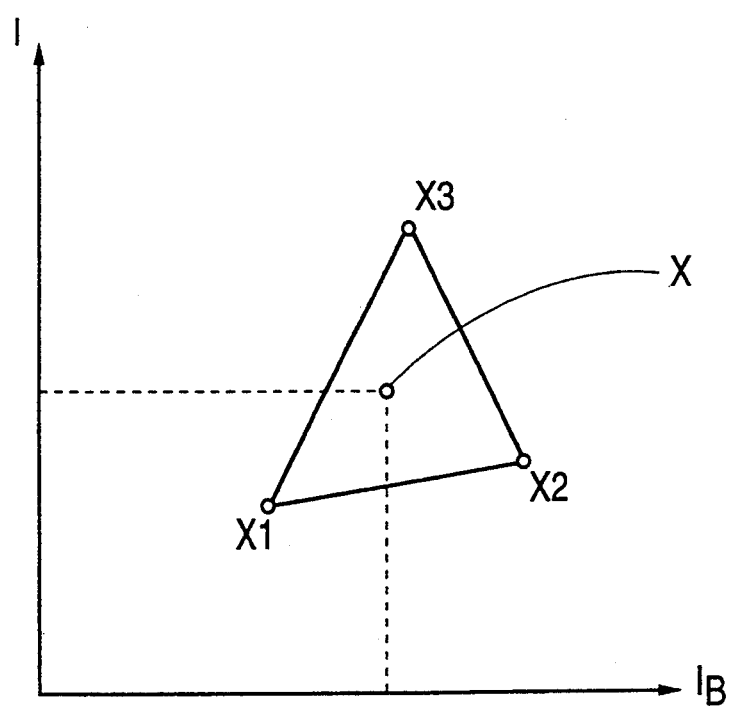
FIG. 2 is an example of curve fitting for the thicknesses X1, X2 and X3.

Another method which is sometime called the piecewise method consists in taking only the values of the calibration data which surround or are close to the values obtained for the unknown sample. This is simply an extension to the three-dimensional case of what is often done in two dimensions and called curve fitting. In practice this would result as shown in FIG. 2 of the accompanying drawings in relating the measurement of the unknown sample to the three closest measurements obtained with the samples previously measured having the thickness X1, X2 and X3. It is then easy to obtain a plane corresponding to the equation:

$$X = aI_b + bI + c$$

and determine the coefficients a, b, c so that the plane passes through the three points representing the sample 123. This having been done, one obtains essentially a function which can be then utilized for the determination of the unknown thickness of the sample. A variation of this method would be to use, not a function corresponding to a plane, but that corresponding to a quadratic function:

$$X = aI^2 + bII_b + c I^2_b + d I + e I_b$$

This requires having 6 points for calibration.

Figure 3:
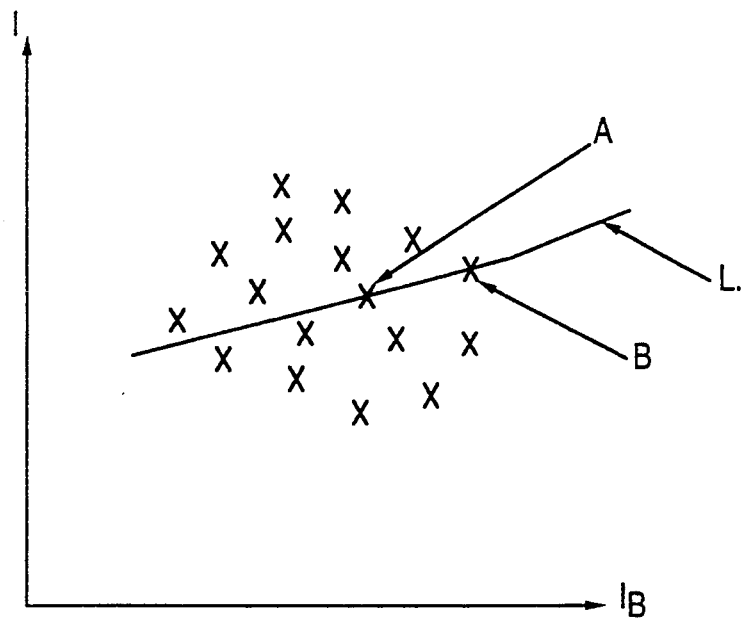
FIGS. 3 and 4 show further examples of curve fitting.
Figure 4:
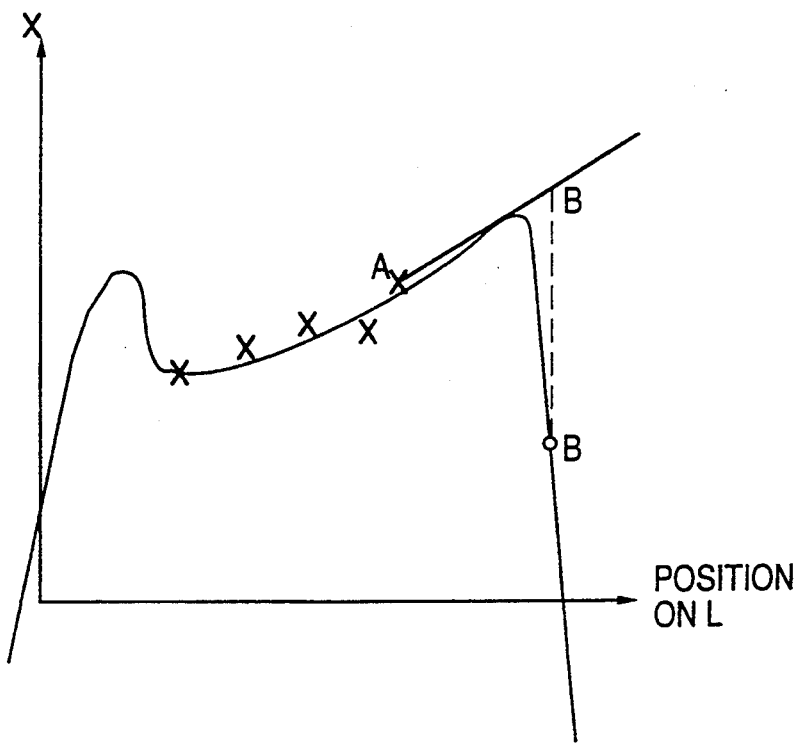

It is well known that curve or surface fitting by means of polynomials yields good results for interpolation but not for extrapolation. Therefore, one must make absolutely certain that the unknown point is clearly circumscribed by all of the known points. On the other hand the polynomial surface may not be fitted through a number of points, but actually pass through all of the data points. FIG. 3 of the accompanying drawings illustrates the two cases. A number of points are used for calibration and the point A and B correspond to measurements made for unknown samples. To measure A, any of the methods is suitable, whereas, to measure B, the surface fit by a polynomial, using at least a square approximation, would be unsuitable as it is on the edge of the domain. To illustrate this point further, we show in FIG. 4 of the accompanying drawings, a cross section of the surface of X as a function of I and $I_b$, through the line L shown in FIG. 3. This illustrates the fact that as soon as the least square approximation has left the domain where it was constrained by the calibration data point its value can vary greatly. Thus, as an illustration we have shown the polynomial for the values measured by point B as yielding a wrong thickness. With some of the other methods, for instance, the one resulting in a plane approximation, this would result in a cross section of the plane shown here, of course, as a straight line, and a measurement obtained for point B which is closer to reality.

Other methods consists of surface fitting such as in "Tensor Products, Finite Element Methods, Moving least squares and composite methods and surface splines" as described in the publication by P. Lancaster and K. Salkauskas mentioned above.

Figure 5:
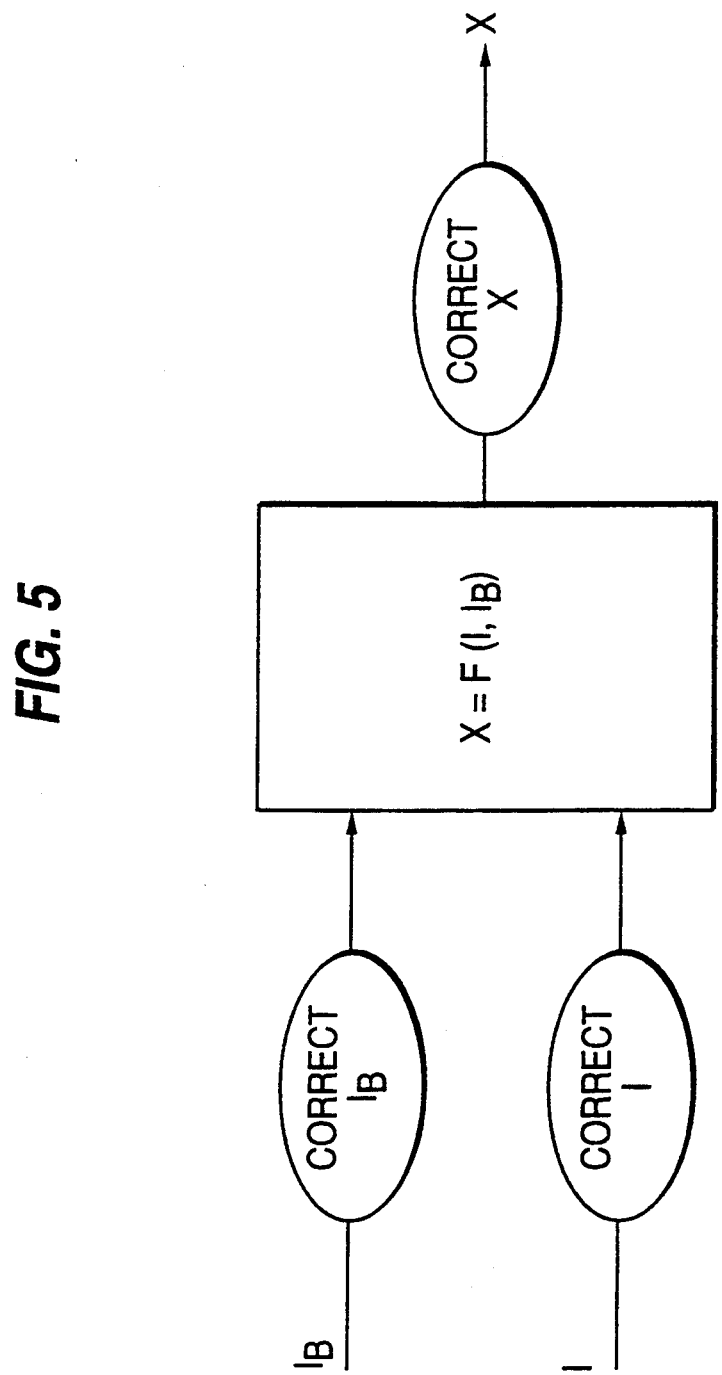
FIG. 5 shows data correction for component drift and geometry changes.

Additional features need to be provided to make the gauge more usable in practice:

Corrections need to be made as indicated in FIG. 5 of the accompanying drawings, to compensate for drift of the various components or changes in geometry of the system. The entire operation of surface fitting by taking a large number of samples is time consuming. It is necessary to have another means of correcting for these in a few seconds. This can be accomplished by inserting the same sample, i.e. standard. Preferably the thickness is roughly within the middle of the measuring range. During the measurement of $I_b$ and I, it may be found that these quantities have drifted by a certain percentage.

Instructions are given to the computer to multiply all of the values of $I_b$ and I by the percentage. This is shown automatically in FIG. 5 where the raw signals are first corrected for these drifts then entered into the computer to obtain the first value of thickness. This value of thickness X is then corrected again for other sources of variation. One of the corrections performed on X is that of temperature. If the material to be measured is at a different temperature, then that of the calibrating samples and the values of X need be multiplied by a certain factor which can be obtained experimentally, or can be easily calculated from the surface expansion coefficient of the material with temperature, which is known from tables. In this case the temperature of the material needs to be measured by a device, not part of this invention.

Other more sophisticated means of correcting for the drift in I consist of deducting from the measured quantities the parasitic signals obtained with the shutter closed, denoted by the suffix sc. To correct for the drift in $I_b$, two measurements are made: one with shutter open denoted $I_{bo}$ and with no sample in the beam. The second is made with a thick sample of a chosen alloy denoted $I_{boo}$. It is then better to work with normalized quantities:

$$R = \frac{I - I_{sc}}{I_o - I_{osc}}$$

$$B = \frac{I_b - I_{bsc}}{I_o - I_{osc}}$$

and apply to the quantities R and B the same methods as described above for I and $I_b$ to generate the function:

$$X = f(R, B)$$

We claim:

1. A method of calculating the thickness of a sheet material comprising directing a beam of photons against the sheet material from a photon source located on one side of said sheet material, detecting reflected radiation from said sheet material in a first detector located on the same side of said sheet material as the photon source and detecting transmitted radiation in a second detector located on the opposite side of the said sheet material from the photon source, combining the signals of transmitted and reflected photon beams, measuring and processing the data from both detectors for a number of calibrating samples using a polynomial in two variables employing a best-fit method, and obtaining the thickness as a function of the detected data and applying this function to determine the unknown thickness of a sample.

2. A method according to claim 1, wherein the best-fit method is a least square approximation.

3. A method according to claim 1, wherein the calibration includes the step of using a sample placed in the beam of photons, memorizing the data representing beam intensity received by the detector and multiplying the data obtained in a measurement by the ratio of variation of the data obtained by the sample.

4. A method according to claim 1, wherein the calibration includes the step of multiplying the intensities of the beam of radiation and the reflected beam by the ratio of these values obtained at the time of measurement to the same values obtained at the time of calibration.

5. A method according to claim 1, wherein computing means are employed to fit a linear function through three points surrounding an unknown point, said linear function being then used to calculate the unknown thickness.

6. A method according to claim 5, wherein the computer functions with a quadratic function and six data points.

7. An apparatus for calculating the thickness of a sheet material comprising a source of photons located on one side of said sheet material, adapted to direct a beam of photons from said photon source against said sheet material, a first detector located on the same side of said sheet material as the photon source for detecting reflected radiation from said sheet material and a second detector located on the opposite side of the said sheet material as the photon source for detecting transmitted radiation, the first detector concentrically surrounding the photon beam source, computing means for combining the signals of transmitted and reflected photon beams and computing and signal processing means for measuring and processing the data from both detectors for a number of calibrating samples using a polynomial in two variables employing a best-fit method, and whereby the thickness of the sheet material is obtained as a function of the detected data and the function is applied to determine the unknown thickness of a sample.

8. Apparatus according to claim 7, wherein the source of photons is an X-ray generator.

9. An apparatus according to claim 7, further comprising a regulating circuit coupled to the photon source that maintains the intensity and energy of the photon source at a constant level.

10. A method of calculating the thickness of a sheet material comprising directing a beam of photons against the sheet material from a photon source located on one side of said sheet material, detecting reflected radiation from said sheet material in a first detector located on the same side of said sheet material as the photon source and detecting transmitted radiation in a second detector located on the opposite side of the said sheet material from the photon source, combining the signals of transmitted and reflected photon beams, measuring and processing the data from both detectors for a number of calibrating samples using a polynomial in two variables employing a best-fit method, wherein the polynomial is of the form: $X = \Sigma a_{ij} I^i I^{bj}$, and obtaining the thickness as a function of the detected data and applying this function to determine the unknown thickness of a sample.

* * * * *